United States Patent Office 3,485,830
Patented Dec. 23, 1969

3,485,830
1-(5-NITROFURFURYLIDENEAMINO)-3-
NITROSO-2-IMIDAZOLIDINONE
Harry R. Snyder, Jr., Norwich, N.Y., assignor to
The Norwich Pharmacal Company, a corporation of Delaware
No Drawing. Filed Dec. 16, 1966, Ser. No. 602,180
Int. Cl. C07d 49/34; A01n 9/22
U.S. Cl. 260—240                                          1 Claim

ABSTRACT OF THE DISCLOSURE

Antibacterially active 1-(5-nitrofurfurylideneamino)-3-nitroso-2-imidazolidinone.

---

This invention relates to chemical compounds and more particularly to the compound 1-(5-nitrofurfurylideneamino)-3-nitroso-2-imidazolidinone of the formula:

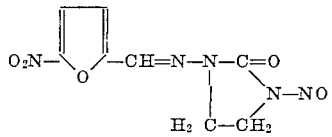

and to compositions containing it.

This compound is an effective antibacterial agent in very small amounts. It is capable of inhibiting the growth of both gram negative and gram-positive bacteria when tested by the commonly used serial dilution technique as exemplified in the following table:

| Organism | Inhibiting concentration mg./ml. |
|---|---|
| S. aureus | 3.0 |
| E. coli | 0.38 |
| S. typhosa | 3.0 |
| S. pyogenes | 3.0 |
| S. agalactiae | 25.0 |
| E. insidiosa | 1.5 |
| A. aerogenes | 12.5 |

It is thus adapted to be combined in solutions, suspensions, sprays, dusts, ointments and the like as an active ingredient to suppress or eradicate bacterial growth.

The compound of this invention is also useful as a medicament in the field of veterinary medicine, particularly in the treatment of diseases of poultry. When admixed at a level of from 0.011–0.022% by weight in the diet and administered to chickens infected by *Eimeria tenella* or *Salmonella gallinarum* protection against the ravages of disease produced by these organisma is secured. The commingling of the compound with a poultry ration is easily accomplished by commonly used procedures such as grinding, stirring or blending.

The preparation of the compound of this invention is readily carried out by nitrosating 1-(5-nitrofurfurylideneamino)-2-imidazolidinone.

In order that this invention may be fully available to and understood by those skilled in the art, the following method of its manufacture is set forth:

1-(5-nitrofurfurylideneamino) - 2 - imidazolidinone (112.0 g., 0.5 mole) is suspended in glacial acetic acid (ca. 800 ml.). The mixture is stirred at room temperature while sodium nitrite (100 g.) is added in small portions over a period of an hour. The bright orange suspension gradually changes to a bright yellow. The mixture is stirred for another three hours and filtered. The crude material is washed with ether and recrystallized from nitromethane to yield 50.5 g., M.P. 228–229° C. dec. (corr.). A second crop of material is obtained by concentrating the filtrate and cooling—33.0 g., m.; 224.5–225.5° C. dec. (corr.). The total yield is 83.5 g. (65.6%). Recrystallization from nitromethane raises the melting point to 231–232° C.

*Analysis.*—Calcd. for $C_8H_7N_5O_5$: C, 37.95; H, 2.79; N, 27.66. Found: C, 37.89; H, 3.03; N, 27.58.

What is claimed is:
1. 1-(5-nitrofurfurylideneamino) - 3 - nitroso-2-imidazolidinone.

References Cited

UNITED STATES PATENTS 2,776,976   1/1957   Michels _____ 260—309.7
3,115,499  12/1963   Michels _____ 260—309.7

JOHN D. RANDOLPH, Primary Examiner

U.S. Cl. X.R.
99—4; 424—273